Nov. 13, 1951        L. T. ASKREN        2,574,997
SELF-STARTING CONTACT TYPE ELECTRIC MOTOR
Filed April 22, 1950
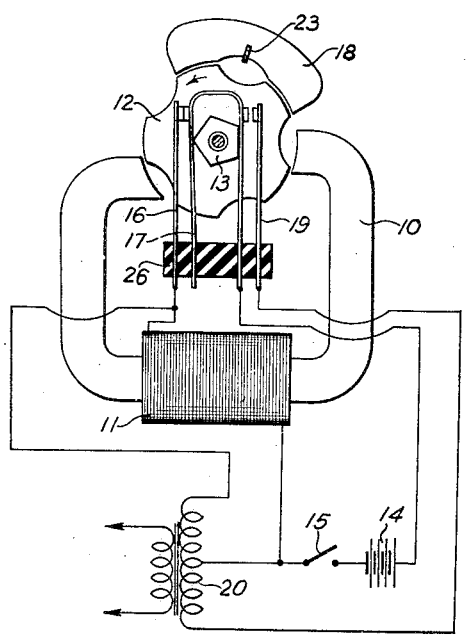
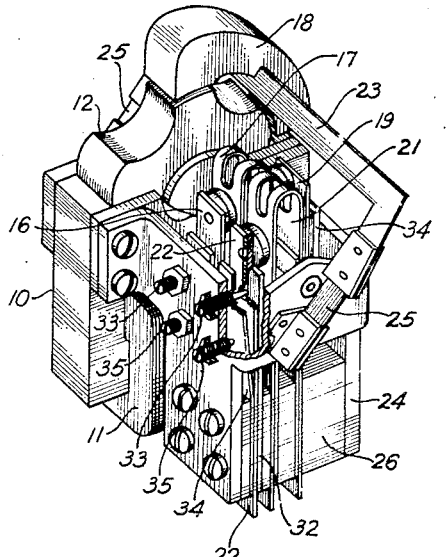
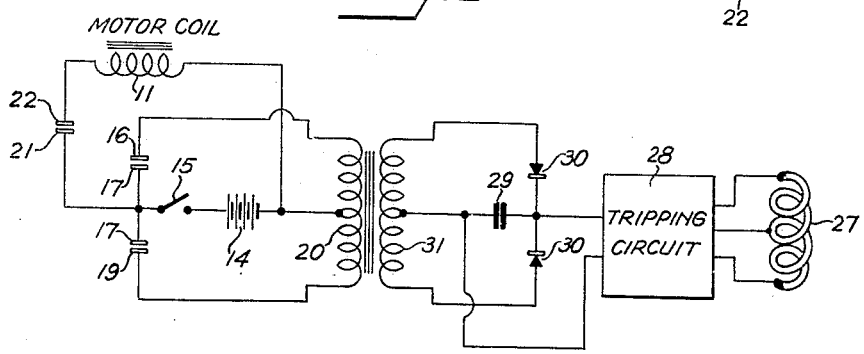
LEE T. ASKREN
Inventor
By Daniel D. Mayne
Rolla N. Carter
Attorneys Patented Nov. 13, 1951

2,574,997

UNITED STATES PATENT OFFICE 2,574,997

SELF-STARTING CONTACT TYPE ELECTRIC MOTOR

Lee T. Askren, Rochester, N. Y., assignor to Eastman Kodak Company, Rochester, N. Y., a corporation of New Jersey Application April 22, 1950, Serial No. 157,581

3 Claims. (Cl. 172—36)

This invention relates to electric motors and more particularly to self-starting motors for vibrator-type power supplies.

It is known that contact-type reaction motors are self-starting if the rotor happens to be properly positioned at standstill where the contacts are closed. An object of the invention is to provide such a motor which is so constructed that its rotor will always stop in a position in which its contacts are closed.

Increasing the frequency of the interrupter permits the use of smaller and lighter circuit components, particularly the transformer, and, in the case of radio power supplies, the filter chokes and condensers. Accordingly, another object of the invention is to provide an interrupter which will operate at a frequency higher than vibrator-type interrupters now available.

Another object of the invention is the provision of an electric motor of the cam-operated contact type which is provided with additional cam-operated contacts so as to be especially useful in vibrator-type power supplies.

The invention will be understood from the following description when read with reference to the accompanying drawing in which:

Fig. 1 represents a self-starting motor associated with the primary of a vibrator-type power supply;

Fig. 2 is a view in perspective of the motor of Fig. 1; and

Fig. 3 is a schematic circuit diagram of the motor of Fig. 2 employed in the power supply of an electronic flashlamp.

In Fig. 1 there is shown a stationary two-pole stator structure having a magnetic yoke 10 and an energizing winding 11. The rotor is shown as consisting of five salient magnetic poles 12 mounted on a shaft 13 provided with five cam faces. The winding 11 is energized from a suitable source of supply such as a battery 14 through a switch 15, relatively movable spring contact arms 16 and 17 which are moved into and out of engagement by the cam shaft 13 acting on the arm 17. The contact arm 17 may be spring-biased against the cam shaft 13 but preferably is made in the form of a U and of a size to enclose the cam shaft 13 and thus provide positive cam action in both directions. The cam shaft 13 may be of insulating material.

The direction of rotation of the rotor depends upon the angular position of the cam shaft 13 with respect to the rotor poles 12 and as shown in Fig. 1 the rotor is set for counter-clockwise rotation. With the switch 15 closed and the rotor in the position shown the circuit of the winding 11 is completed through the contact arms 16 and 17 and the rotor is moved to aline two of the poles 12 with the poles of the magnetic yoke 10 at which time the contact arms 16 and 17 will separate to open the circuit of the coil 11 and permit the momentum of the rotor to move the next two poles 12 into position to be attracted by the stator poles when the cam shaft 13 again energizes the winding 11. Thus in a well-known manner the contact arms 16 and 17 allow five current impulses to traverse the winding 11 for each complete revolution and these current impulses are so timed by the cam shaft 13 that they occur at the proper times to produce forward torque of the rotor. The torque impulses occur over about 36 degrees rotation of the rotor between approximately maximum and minimum reluctance positions with respect to the stator poles. The angular duration of the torque impulses will, of course, differ when a rotor having a different number of salient poles 12 is used.

If the rotor is properly positioned at standstill where the contact arms 16 and 17 are in circuit closing position, the motor will start and run up to speed upon closing the switch 15. In accordance with the invention, the motor is so constructed that its rotor always comes to a standstill with the cam shaft 13 in a position which holds the contact arms 16 and 17 closed, thereby insuring that the motor will start whenever the switch 15 is closed. In order that the rotor shall always stop in this self-starting position a magnetic arresting device 18 has been provided in the embodiment illustrated. It will, however, be understood that it may be replaced by a suitable mechanical arresting device.

By arranging an additional contact arm 19 in position to be engaged by the contact arm 17 alternately with the contact arm 16, a pair of contacts are provided which may be employed to interrupt the primary winding 20 of a vibrator-type power supply for radios, electronic flashlamps and the like. The motor, as described, has been constructed to operate at 4800 R. P. M. which provides 800 interruptions per second which high frequency (for vibrator-type interrupters) permits the use of smaller and lighter circuit components, particularly the transformer.

When a single pair of contact arms 16 and 17 are utilized as shown in Fig. 1 to interrupt both the circuit to the primary 20 and the circuit of the motor winding 11, the speed regulation of the motor is poor due probably to voltage induced in the open half of the primary winding 20. Speed regulation is greatly improved by providing a separate pair of contacts for each circuit as shown in Figs. 2 and 3.

As shown in Fig. 2, the cam shaft 13 is provided with an additional follower 21 which cooperates with a contact arm 22 to provide an additional pair of contacts which may be used to interrupt the motor winding 11 as illustrated in Fig. 3. Also, as shown in Fig. 2, the magnetic arresting device 18 is carried by an arm 23 which is secured to the motor frame 24 through flat springs 25 extending through the axis of the motor whereby the magnet 18 is permitted limited oscillatory movement which aids the capture of two pole salients 12 as the rotor comes to rest.

The several contact arms 16, 17, 19, 21 and 22 may be electrically isolated by mounting them in a block 26 of insulating material suitably secured to the frame 24.

A portion of the frame 24 is shown broken away in Fig. 2 to reveal an arrangement which has been found convenient for regulating within limits the duration of the engagement of the contact arms 21 and 22. The contact arm 22 which in effect is a flat spring is biased by its own internal stress toward the cam-actuated arm 21, but its movement in this direction is limited by a leaf member 32, preferably of insulating material, which is self-biased in the opposite direction so that the position of the member 32 as determined by the setting of an adjusting screw 33 defines the ratio between the duration of engagement and nonengagement of the contact arms 21 and 22. The adjusting screw 33 is anchored in the frame 24 and may extend through an opening provided in the contact arm 22. The other contact arms 16 and 19 are provided with similar means for adjusting their positions with respect to their cooperating cam-actuated arm 17.

In order to prevent any undesired vibrations being set up or induced in the contact arms 16, 19 and 22, their movement may be suitably damped by leaf members 34 variably engaging their external surfaces as determined by the setting of adjusting screws 35.

Fig. 3 is a schematic circuit diagram showing the motor driven interrupter of the invention employed as the power supply for an electronic flash lamp 27. The flash lamp 27 is connected in conventional fashion through a tripping circuit 28 to a main storage condenser 29 which is charged through rectifiers 30 from the secondary winding 31 associated with the primary winding 20.

In the foregoing description, only a motor having a rotor with five salient poles has been described, but it will be evident to those skilled in the art that the invention is not confined to a five-pole rotor. However, when more than two poles are used, an odd number of poles is preferred for the reason that it simplifies the design of a positive action cam for actuating the contact arms.

While for the purpose of explaining the invention a preferred embodiment thereof has been described in detail, it is to be understood that the invention contemplates other embodiments coming within the scope of the appended claims.

I claim:

1. In an electric motor, a field magnet, a salient pole magnetic rotor, a contact device operated by rotation of said rotor for controlling the energization of the field magnet, a permanent magnet adjacent the periphery of said rotor, and support means for yieldingly holding the permanent magnet adjacent the position of a rotor salient pole when said rotor is at standstill with the contact device closed, said support means being constructed to yield only in the direction of rotation of said rotor.

2. An electric motor driven interruptor for vibrator-type power supplies comprising a stationary field magnet having an energizing winding, a rotor supported by a shaft for rotation in the field magnet, a cam of insulating material rotatable with the shaft, a U-shaped contact arm enclosing the cam so as to be positively moved back and forth between two extreme positions, and two interrupter contacts spaced on opposite sides of said contact arm so as to be engaged alternately by said contact arm as it moves back and forth, one of said interrupter contacts and the contact arm being connected in circuit controlling relation with said energizing winding.

3. A self-starting motor driven interrupter for vibrator-type power supplies comprising a rotatable shaft, a cam and a salient pole rotor carried by the shaft, two pairs of normally open contacts arranged to be alternately closed by the cam, a stator for cooperating with the rotor, a winding for energizing the stator, a third pair of contacts in series with the winding and arranged to be opened and closed by the cam in timed relation with the rotation of the rotor, and means for bringing the rotor to a standstill position in which the third pair of contacts is closed.

LEE T. ASKREN.

REFERENCES CITED

The following references are of record in the file of this patent:

UNITED STATES PATENTS

| Number | Name | Date |
|---|---|---|
| 2,266,037 | Henninger et al. | Dec. 16, 1944 |